US011152153B2

(12) United States Patent
Cha et al.

(10) Patent No.: US 11,152,153 B2
(45) Date of Patent: Oct. 19, 2021

(54) MULTILAYER CERAMIC ELECTRONIC COMPONENT WITH INTERNAL ELECTRODE INCLUDING NICKEL POWDER AND COPPER COATING LAYER AND METHOD OF MANUFACTURING THE SAME

(71) Applicant: SAMSUNG ELECTRO-MECHANICS CO., LTD., Suwon-si (KR)

(72) Inventors: Kyoung Jin Cha, Suwon-si (KR); Jeong Ryeol Kim, Suwon-si (KR); Kyung Ryul Lee, Suwon-si (KR); Young Joon Oh, Suwon-si (KR); Hyo Min Kang, Suwon-si (KR); Jun Oh Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 42 days.

(21) Appl. No.: 16/156,911

(22) Filed: Oct. 10, 2018

(65) Prior Publication Data

US 2020/0058442 A1 Feb. 20, 2020

(30) Foreign Application Priority Data

Aug. 16, 2018 (KR) .......................... 10-2018-0095498

(51) Int. Cl.
*H01G 4/008* (2006.01)
*H01G 4/30* (2006.01)
*H01G 4/232* (2006.01)

(52) U.S. Cl.
CPC ............. *H01G 4/0085* (2013.01); *H01G 4/30* (2013.01); *H01G 4/2325* (2013.01)

(58) Field of Classification Search
CPC ...... H01G 4/0085; H01G 4/12; H01G 4/2325; H01G 4/30
See application file for complete search history.

(56) References Cited

U.S. PATENT DOCUMENTS 6,927,966 B2 * 8/2005 Miyazaki ................ B32B 18/00
361/321.2
7,727,630 B2 6/2010 Kodas et al.
(Continued)

FOREIGN PATENT DOCUMENTS

JP 3527854 B2 5/2004
JP 5950032 B2 7/2016
(Continued)

OTHER PUBLICATIONS

Korean Office Action dated Sep. 20, 2019 issued in Korean Patent Application No. 10-2018-0095498 (with English translation).
(Continued)

*Primary Examiner* — Minh N Trinh
(74) *Attorney, Agent, or Firm* — Morgan, Lewis & Bockius LLP

(57) ABSTRACT

A method of manufacturing a multilayer ceramic electronic component includes preparing a ceramic green sheet, forming an internal electrode pattern by coating a paste for an internal electrode including nickel (Ni) powder including a coating layer having a surface including copper (Cu) on the ceramic green sheet, forming a ceramic multilayer structure by stacking the ceramic green sheet with the internal electrode pattern formed thereon, and forming a body including a dielectric layer and an internal electrode by sintering the ceramic multilayer structure. The content of Cu is equal to or greater than 0.2 wt %, based on a total weight of the Ni powder.

13 Claims, 7 Drawing Sheets

(56) References Cited

U.S. PATENT DOCUMENTS

| | | | | |
|---|---|---|---|---|
| 7,817,402 B2* | 10/2010 | Miura | ................... | H01G 4/008 |
| | | | | 361/305 |
| 8,971,016 B1* | 3/2015 | Nagamoto | ............. | H01G 4/012 |
| | | | | 361/301.4 |
| 9,053,856 B2* | 6/2015 | Kim | ......................... | H01B 1/22 |
| 9,761,376 B2* | 9/2017 | Nagamoto | ............... | H01G 4/30 |
| 2004/0175569 A1 | 9/2004 | Uchida | | |
| 2016/0035490 A1 | 2/2016 | Tsuru et al. | | |
| 2016/0126014 A1* | 5/2016 | Lee | ...................... | H01G 4/1209 |
| | | | | 361/301.4 |
| 2020/0058442 A1* | 2/2020 | Cha | ........................ | H01G 4/30 |

FOREIGN PATENT DOCUMENTS

| | | |
|---|---|---|
| KR | 10-2004-0078535 A | 9/2004 |
| KR | 10-2014-0126731 A | 10/2014 |
| KR | 10-2015-0012075 A | 2/2015 |
| KR | 10-2015-0131316 A | 11/2015 |
| KR | 10-1813284 B1 | 12/2017 |

OTHER PUBLICATIONS

Notice of Office Action dated Mar. 30, 2020 in Korean Patent Application No. 10-2018-0095498 (English Translation).

* cited by examiner

MULTILAYER CERAMIC ELECTRONIC COMPONENT WITH INTERNAL ELECTRODE INCLUDING NICKEL POWDER AND COPPER COATING LAYER AND METHOD OF MANUFACTURING THE SAME

CROSS-REFERENCE TO RELATED APPLICATION(S)

This application claims the benefit of priority to Korean Patent Application No. 10-2018-0095498 filed on Aug. 16, 2018 in the Korean Intellectual Property Office, the disclosure of which is incorporated herein by reference in its entirety.

BACKGROUND

1. Field

The present disclosure relates to a multilayer ceramic electronic component and a method of manufacturing the same.

2. Description of Related Art

In general, an electronic component using a ceramic material, for example, a capacitor, an inductor, a piezoelectric element, a varistor, or a thermistor, includes a body formed of a ceramic material, an internal electrode formed in the body, and an external electrode installed on a surface of the body to be connected to the internal electrode.

A multilayer ceramic capacitor of a multilayer ceramic electronic component includes a plurality of stacked dielectric layers, internal electrodes disposed to face each other across the dielectric layer, and an external electrode that is electrically connected to the internal electrode.

A multilayer ceramic capacitor may be miniaturized to have high specification and may be advantageously and easily installed and, thus, has been widely used as a component of a mobile communication device, such as a computer, a personal digital assistant (PDA), and a cellular phone.

Recently, along with high specification, and lightness, thinness, compactness, and smallness in electrical and electronic device industries, there has been a need for a miniaturized, high-capacity, and super high-capacity electronic components.

In particular, there is a need for a technology for maximizing capacitance per unit volume along with high capacity and miniaturization of a multilayer ceramic capacitor.

Accordingly, in the case of an internal electrode, high capacity needs to be embodied by minimizing a volume and increasing a stacking number while achieving a maximum area.

However, as an internal electrode is thinned, there may be a problem in which electrolytic cracking occurs and waterproof reliability is degraded and here, a main cause of such cracking is delamination between an internal electrode and a dielectric layer.

Accordingly, to embody a high-capacity multilayer ceramic capacitor, there is a need for a method of embodying a miniaturized and high-capacity multilayer ceramic capacitor having excellent waterproof reliability by preventing electrolytic cracking from occurring.

To embody a miniaturized and high-capacity multilayer ceramic capacitor, it is important to enhance waterproof reliability without sinterability deterioration.

SUMMARY

An aspect of the present disclosure may provide a method of manufacturing a multilayer ceramic electronic component, for preventing electrolytic cracking from occurring without sinterability deterioration to embody a miniaturized and high-capacity multilayer ceramic capacitor having excellent waterproof reliability.

According to an aspect of the present disclosure, a method of manufacturing a multilayer ceramic electronic component may include preparing a ceramic green sheet, forming an internal electrode pattern by coating a paste for an internal electrode including nickel (Ni) powder having a coating layer with a surface including copper (Cu) on the ceramic green sheet, forming a ceramic multilayer structure by stacking the ceramic green sheet with the internal electrode pattern formed thereon, and forming a body including a dielectric layer and an internal electrode by sintering the ceramic multilayer structure, wherein a content of Cu is equal to or greater than 0.2 wt %, based on a total weight of the Ni powder.

According to another aspect of the present disclosure, a multilayer ceramic electronic component manufactured using the method as described above may include a ceramic body including a dielectric layer and an internal electrode, and an external electrode disposed on the ceramic body, wherein the internal electrode includes nickel (Ni) and copper (Cu).

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1A:
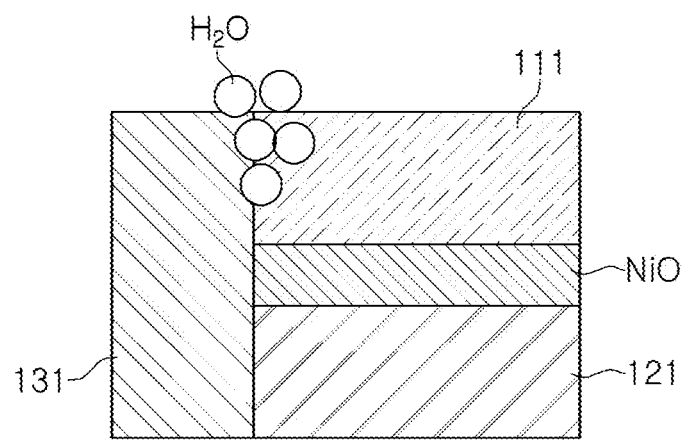
FIGS. 1A-1C are schematic diagrams illustrating a delamination procedure between an internal electrode and a dielectric layer along with moisture penetration.

Hereinafter, exemplary embodiments of the present disclosure will now be described in detail with reference to the accompanying drawings.

In the drawings, an X direction may be defined as a first direction, an L direction, or a longitudinal direction, a Y direction may be defined as a second direction, a W direction, or a width direction, and a Z direction may be defined as a third direction, a T direction, or a thickness direction.

Figure 1B:
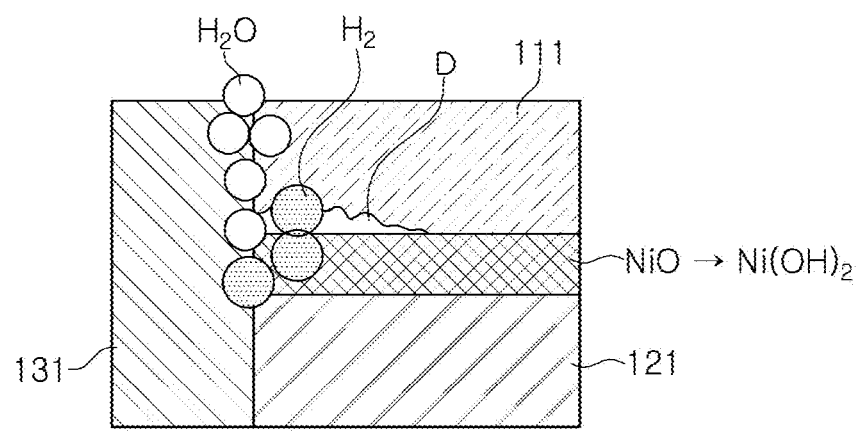
Figure 1C:
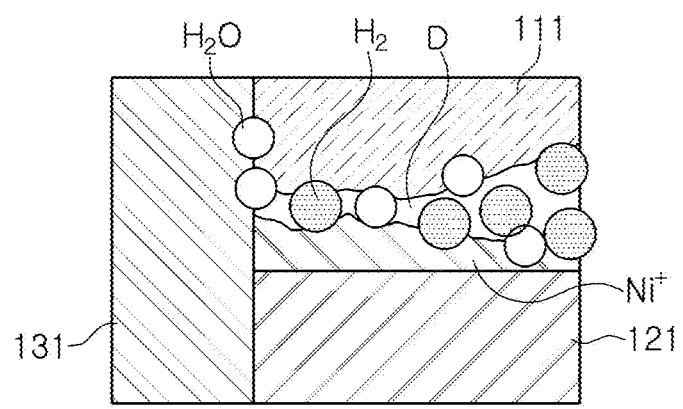

FIGS. 1A-1C are schematic diagrams illustrating a delamination procedure between an internal electrode and a dielectric layer along with moisture penetration.

Figure 2:
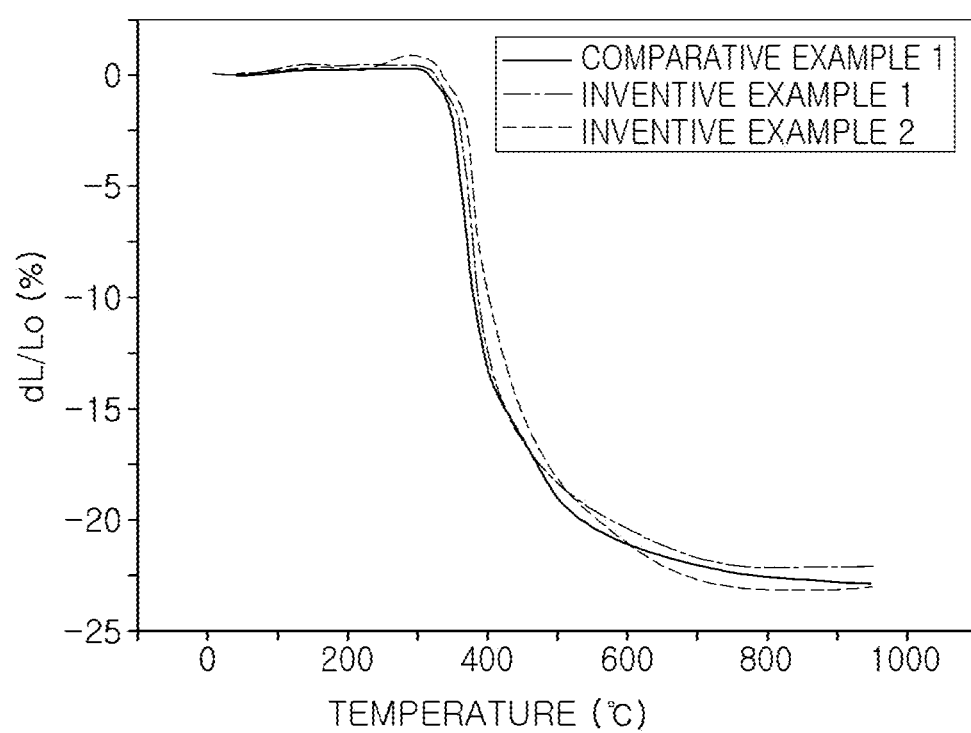
FIG. 2 is a graph showing a comparison of a thermal contraction behavior depending on a change in content of copper (Cu) included in a coating layer compared with nickel (Ni) powder and, in FIG. 2, Comparative Example 1 corresponds to Ni powder without Cu, Inventive Example 1 corresponds to Ni powder including a coating layer with Cu content of 0.2 wt %, and Inventive Example 2 corresponds to Ni powder including a coating layer with Cu content of 1.5 wt %.

FIG. 2 is a graph showing a comparison of a thermal contraction behavior depending on a change in content of copper (Cu) included in a coating layer, based on a total weight of a nickel (Ni) powder. In FIG. 2, Comparative Example 1 corresponds to Ni powder without a coating layer including Cu, Inventive Example 1 corresponds to Ni powder including a coating layer with Cu content of 0.2 wt %, and Inventive Example 2 corresponds to Ni powder including a coating layer with Cu content of 1.5 wt %, based on a total weight of the nickel (Ni) powder.

Figure 3A:
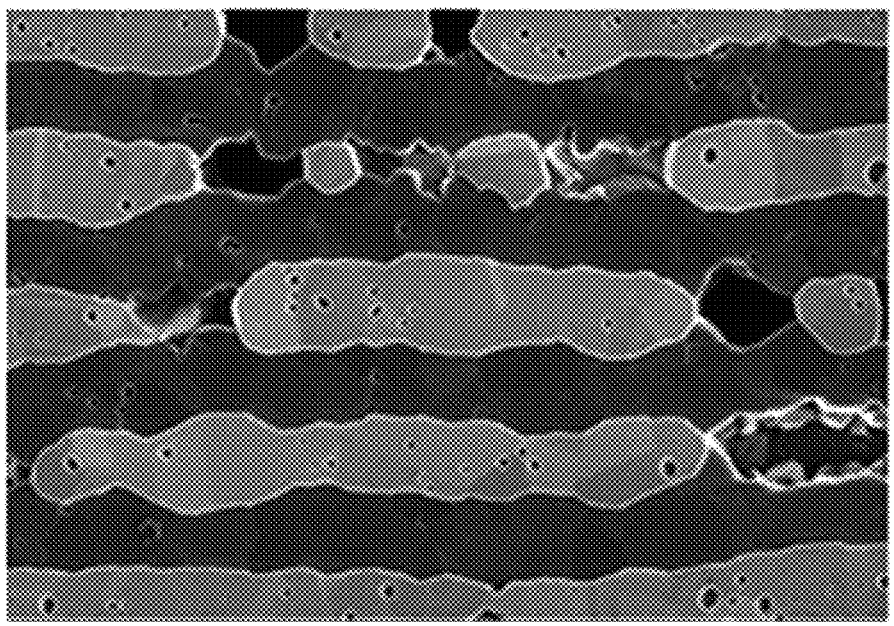
FIG. 3A is an image obtained by photographing an internal electrode formed in Comparative Example 1 of FIG. 2
Figure 3B:
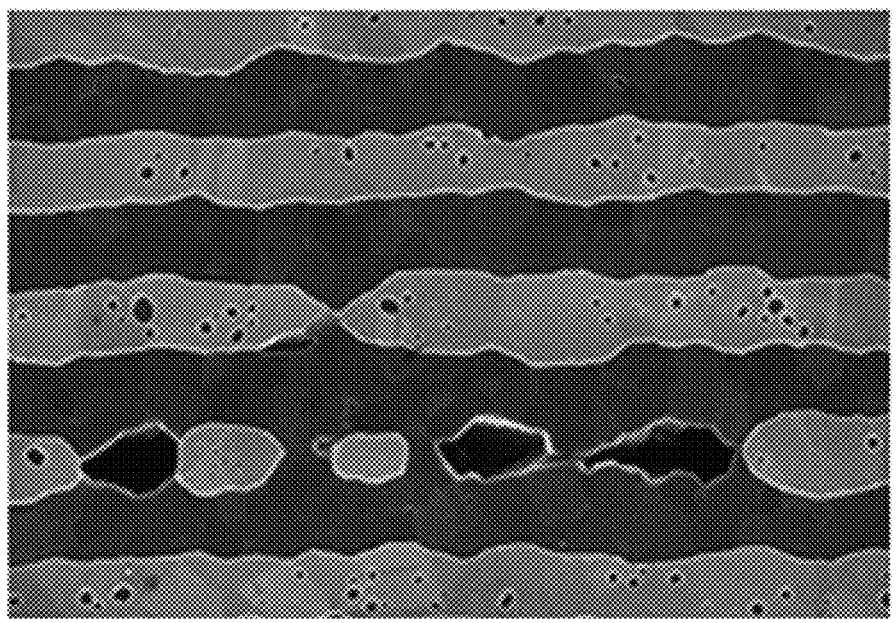
FIG. 3B is an image obtained by photographing an internal electrode formed in Inventive Example 1 of FIG. 2.

FIG. 3A is an image obtained by photographing an internal electrode formed in Comparative Example 1 of FIG. 2. FIG. 3B is an image obtained by photographing an internal electrode formed in Inventive Example 1 of FIG. 2.

Figure 4:
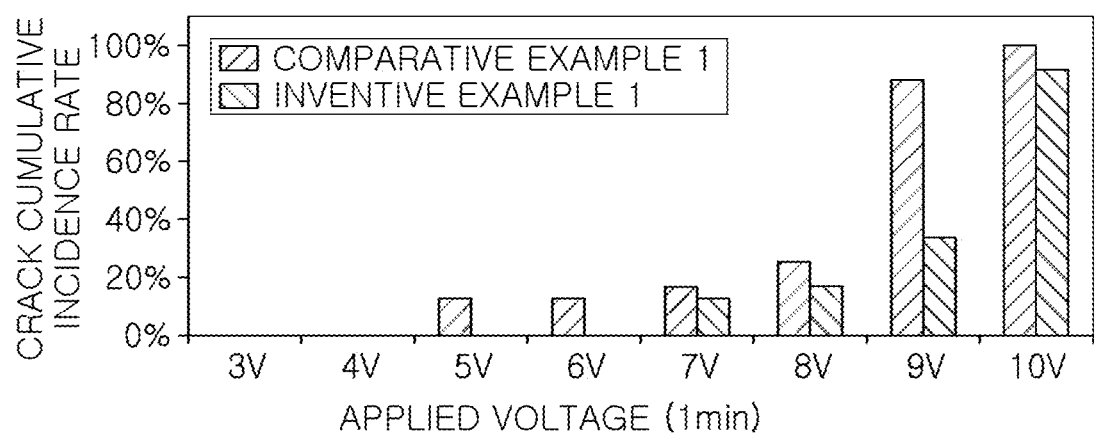
FIG. 4 is a graph showing a crack cumulative incidence rate depending on an applied voltage according to Comparative Example 1 and Inventive Example 1 of FIG. 2.

FIG. 4 is a graph showing a crack cumulative incidence rate depending on an applied voltage according to Comparative Example 1 and Inventive Example 1 of FIG. 2.

Figure 5A:
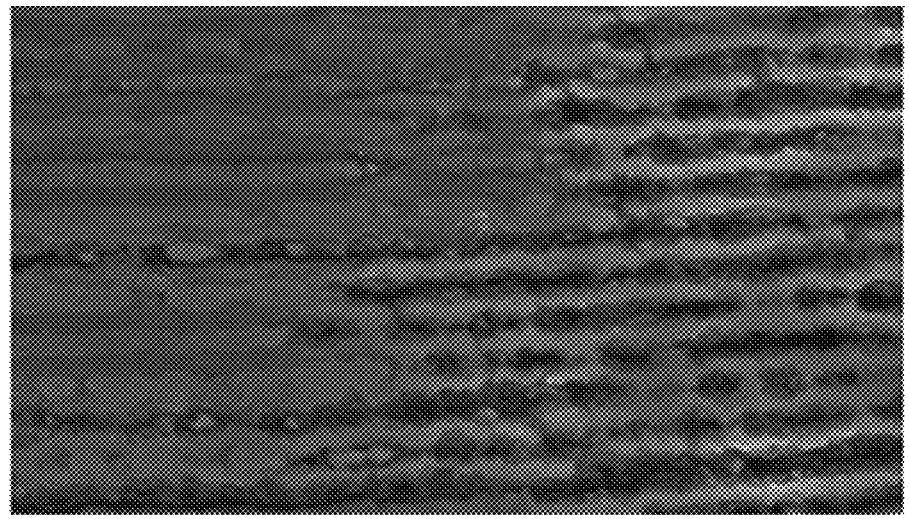
FIG. 5A is an image obtained by photographing an internal electrode formed in Comparative Example 1 of FIG. 2 after plating solution erosion evaluation and FIG. 5B is an image obtained by photographing an internal electrode formed in Inventive Example 1 of FIG. 2 after plating solution erosion evaluation.
Figure 5B:
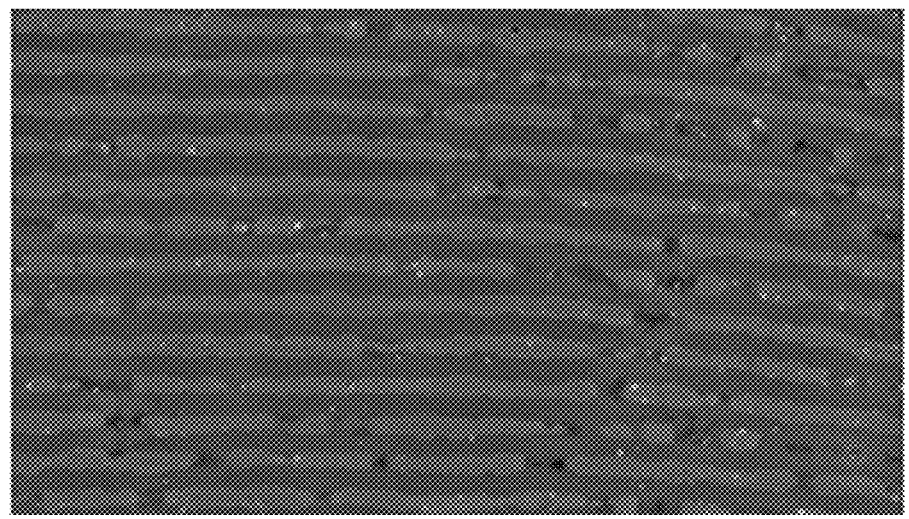

FIG. 5A is an image obtained by photographing an internal electrode formed in Comparative Example 1 of FIG. 2 after plating solution erosion evaluation. FIG. 5B is an image obtained by photographing an internal electrode formed in Inventive Example 1 of FIG. 2 after plating solution erosion evaluation.

Figure 6A:
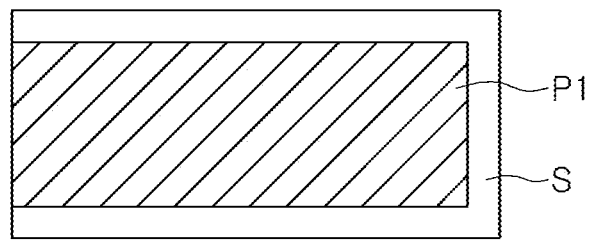
FIGS. 6A and 6B are schematic diagrams showing ceramic green sheets with an internal electrode pattern formed thereon.
Figure 6A:
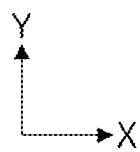
Figure 6B:
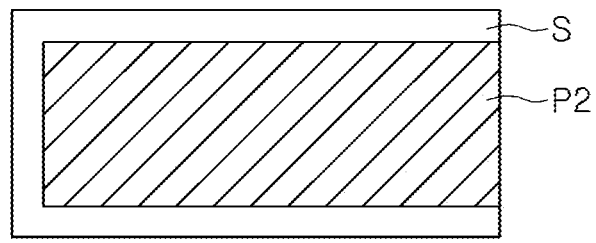
Figure 6B:
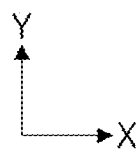

FIGS. 6A and 6B are schematic diagrams showing ceramic green sheets with an internal electrode pattern formed thereon.

Figure 7:
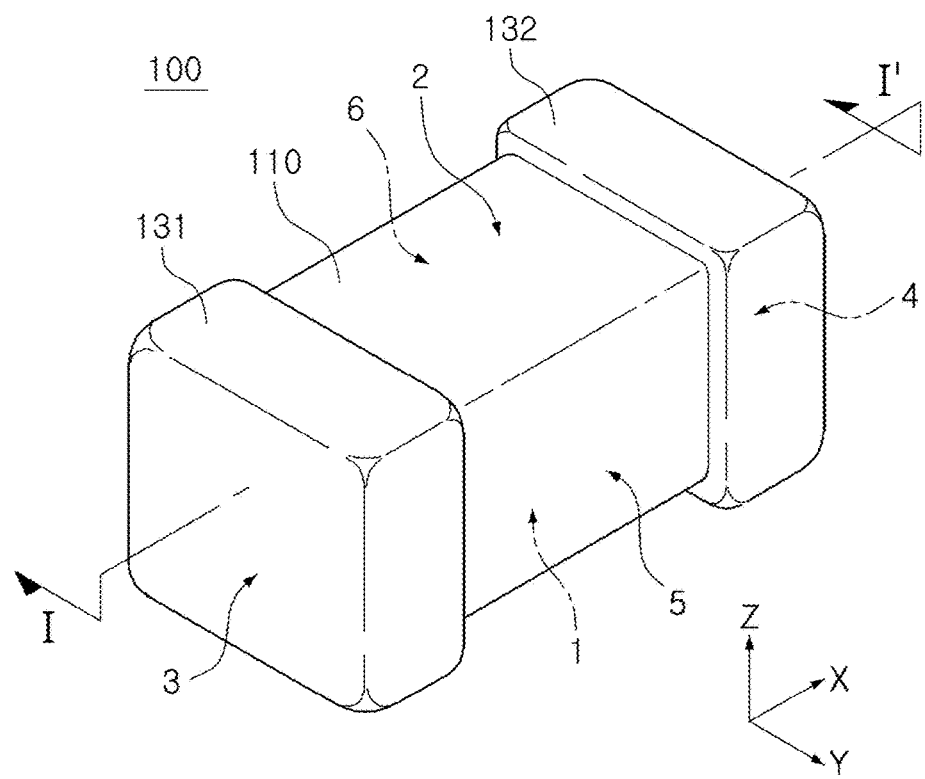
FIG. 7 is a schematic perspective view of a multilayer ceramic electronic component manufactured using a method of manufacturing a multilayer ceramic electronic component according to an exemplary embodiment of the present disclosure.

FIG. 7 is a schematic perspective view of a multilayer ceramic electronic component manufactured using a method of manufacturing a multilayer ceramic electronic component according to an exemplary embodiment of the present disclosure.

Figure 8:
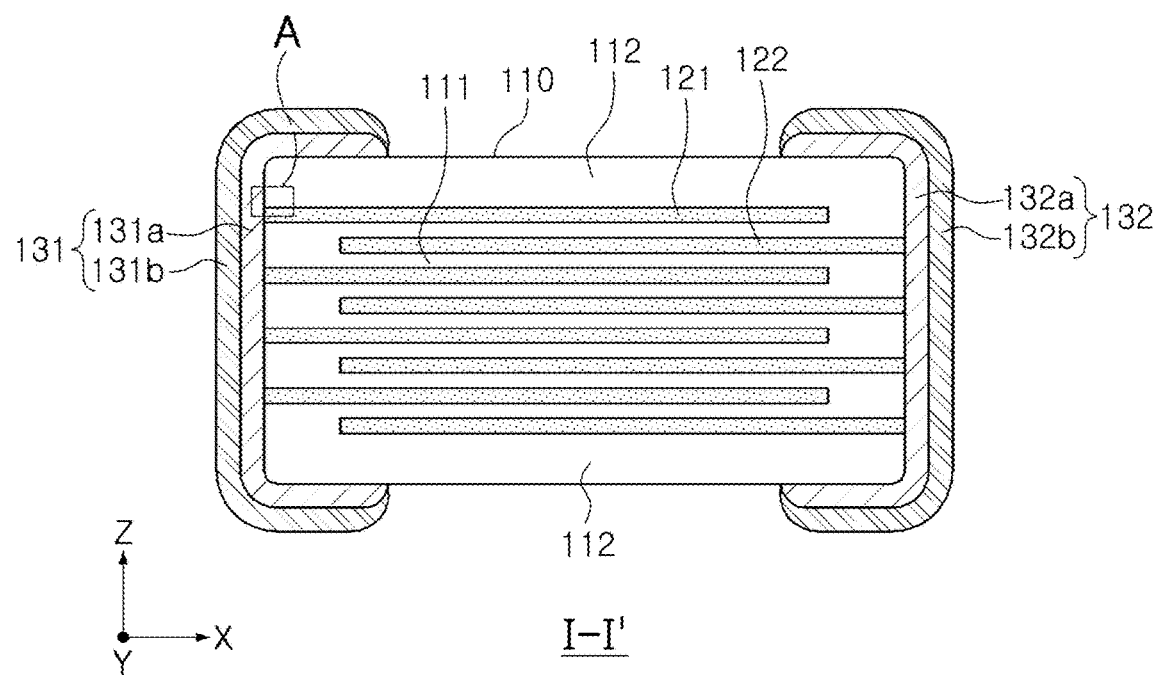
FIG. 8 is a cross-sectional view taken along a line I-I' of FIG. 7.

FIG. 8 is a cross-sectional view taken along a line I-I' of FIG. 7.

Hereinafter, a method of manufacturing a multilayer ceramic electronic component and a multilayer ceramic electronic component manufactured using the method according to an exemplary embodiment of the present disclosure are described in detail with reference to FIGS. 1 to 8.

Method of Manufacturing Multilayer Ceramic Electronic Component

A method of manufacturing a multilayer ceramic electronic component according to an exemplary embodiment of the present disclosure may include preparing a ceramic green sheet, forming an internal electrode pattern by coating a paste for an internal electrode including Ni powder including a coating layer with a surface including Cu, on the ceramic green sheet, forming a ceramic multilayer structure by stacking ceramic green sheets on which the internal electrode pattern is formed; and forming a body including a dielectric layer and an internal electrode by sintering the ceramic multilayer structure and, in this case, the Cu content may be equal to or greater than 0.2 wt %, based on a total weight of the Ni powder.

Preparing Ceramic Green Sheet

A ceramic green sheet including ceramic powder is prepared.

The ceramic green sheet may be prepared by mixing ceramic powder, a binder, and a solvent, and so on to prepare slurry and forming the slurry using a doctor blade in the form a sheet with a thickness of several µm. Then, the ceramic green sheet may be sintered to form one dielectric layer 111 as shown in FIG. 5.

The ceramic green sheet may have a thickness equal to or less than 0.6 µm and, thus, the dielectric layer may have a thickness equal to or less than 0.4 µm after being sintered.

According to an exemplary embodiment of the present disclosure, even if a dielectric layer and an internal electrode are very thin, increase in electrode disconnection and delamination may be effectively prevented and, thus, a dielectric layer with a thickness equal to or less than 0.4 µm may be formed.

Forming Internal Electrode Pattern

A paste for an internal electrode including Ni powder including a coating layer with a surface including Cu may be coated on the ceramic green sheet to form an internal electrode pattern. The Cu content may be equal to or greater than 0.2 wt %, based on a total weight of the Ni powder.

The internal electrode pattern may be formed using a screen printing method or a Gravure printing method.

Recently, along with high specification, and lightness, thinness, compactness, and smallness in electrical and electronic device industries, there has been a need for a miniaturized, high-capacity, and super high-capacity electronic components.

In particular, there is a need for a technology for maximizing capacitance per unit volume along with high capacity and miniaturization of a multilayer ceramic capacitor.

Accordingly, in the case of an internal electrode, high capacity needs to be embodied by minimizing a volume and increasing a stack number while achieving a maximum area.

However, as an internal electrode is thinned, there is a problem in that electrolytic cracking occurs and waterproof reliability is degraded and main cause of such crack is delamination between an internal electrode and a dielectric layer.

A procedure in which delamination between the internal electrode and the dielectric layer occurs is now described with reference to FIGS. 1A-1C. As shown in FIG. 1A, moisture penetrates through an external electrode or the like. Then, as shown in FIG. 1B, a reaction of [NiO+$H_2O \rightarrow$Ni(OH)$_2$] occurs at an interface between the internal electrode 121 and the dielectric layer 111 and a reaction of [2H$_2$0($l$)+2e-$\rightarrow$H$_2$(g)+2OH-(aq)] occurs at a surface of the internal electrode 121. As shown in FIG. 1C, a reaction of [Ni(OH)$_2$+2e-+OH-$\rightarrow$Ni++3OH-] occurs at an interface between the internal electrode 121 and the dielectric layer 111 and a reaction of [2H$_2$O(l)+2e-$\rightarrow$H$_2$(g)+2OH-(aq)] occurs at a surface of the internal electrode 121 and, in this case, H$_2$ generated in this process may degrade adhesive force between the internal electrode and the dielectric layer and delamination therebetween occurs. In this case, FIGS. 1A-1C shown an enlarged view of a portion 'A' of FIG. 8.

According to an exemplary embodiment of the present disclosure, Cu of Ni powder including a coating layer with a surface including Cu may degrade electron mobility of Ni, thereby preventing delamination between the internal electrode and the dielectric layer, which is a main cause of cracks. Accordingly, plating anticorrosion, electrolytic delamination characteristics, and waterproof reliability may be enhanced.

According to an exemplary embodiment of the present disclosure, Ni powder including a coating layer with a surface including Cu may enhance plating anticorrosion, electrolytic delamination characteristics, and waterproof reliability without sinterability deterioration.

Accordingly, according to an exemplary embodiment of the present disclosure, a miniaturized and high-capacity multilayer ceramic capacitor with excellent waterproof reliability may be embodied.

FIG. 2 is a graph showing comparison of a thermal contraction behavior depending on a change in content of Cu included in a coating layer compared with Ni powder. In FIG. 2, Comparative Example 1 corresponds to Ni powder without a coating layer including Cu, Inventive Example 1 corresponds to Ni powder including a coating layer with Cu content of 0.2 wt %, based on a total weight of the Ni powder, and Inventive Example 2 corresponds to Ni powder including a coating layer with Cu content of 1.5 wt %, based on a total weight of the Ni powder.

As seen from FIG. 2, even if a coating layer including Cu is added, a thermal contraction behavior barely changes and, instead, temperature at which contraction begins is slightly enhanced compared with Comparative Example 1 without a coating layer including Cu and, thus, there is no sinterability deterioration.

FIG. 3A is an image obtained by photographing an internal electrode formed in Comparative Example 1 of FIG. 2. FIG. 3B is an image obtained by photographing an internal electrode formed in Inventive Example 1 of FIG. 2.

As seen from FIGS. 3A and 3B, Inventive Example 1 has excellent electrode connectivity compared with Comparative Example 1 without Cu.

FIG. 4 is a graph showing a crack cumulative incidence rate depending on an applied voltage according to Comparative Example 1 and Inventive Example 1 of FIG. 2.

As seen from FIG. 4, in the case of Comparative Example 1, crack begins to occur in an applied voltage of 5 V but, in the case of Inventive Example 1, crack begins to occur in an applied voltage of 7 V. In addition, it may be seen that a crack cumulative incidence rate is much different at an applied voltage of 9 V.

FIG. 5A is an image obtained by photographing an internal electrode formed in Comparative Example 1 of FIG. 2 after plating solution erosion evaluation. FIG. 5B is an image obtained by photographing an internal electrode formed in Inventive Example 1 of FIG. 2 after plating solution erosion evaluation.

As seen from FIGS. 5A and 5B, Inventive Example 1 has very low plating solution erosion compared to Comparative Example 1.

The coating layer may further include tin (Sn). The Ni power may further include Sn in the form of an alloy.

Ni powder with a coating layer including Sn may prevent Ni powder particles from contacting each other to delay sintering irrespective of dispersibility and Ni powder including Sn in the form of an alloy may also delay sintering irrespective of dispersibility.

Ni powder includes Sn and, thus, residual carbon (crystallized carbon) may be prevented from being formed due to a function of a dehydrogenation catalyst of Ni powder during plasticization.

Sn is barely solidified in Ni powder but has good wettability with Ni powder and a low melting point and, thus, Sn may be thickened on a surface of Ni crystal grain of an internal electrode during a sintering procedure to form a composite layer including Ni and Sn, thereby preventing a crystal grain from being grown.

The coating layer may further include one or more of tungsten (W), molybdenum (Mo), chromium (Cr), and cobalt (Co). The Ni powder may further include an alloy including at least one or more of W, Mo, Cr, and Co.

When one or more of W, Mo, Cr, and Co which are high melting point metal are added, sintering of Ni at the initial stage of sintering may be delayed, and the metal may also be applied in the same way at high temperature in a next procedure to effectively prevent an electrode from being degraded and, after sintering, the metal may be present in the internal electrode without escaping to a dielectric layer and, thus, the characteristics of a dielectric are not changed.

In addition, a coating layer including Cu formed on a surface of the Ni powder may further include one or more of silver (Ag), palladium (Pd), platinum (Pt), rhodium (Rh), iridium (Ir), and ruthenium (Ru). The Ni powder may include an alloy including one or more of Cu, Ag, Pd, Pt, Rh, Ir, and Ru.

The paste for the internal electrode may further include sulfur (S) of 300 ppm or less (excluding 0) based on content of the Ni powder.

The coating layer may be formed using an atomic layer deposition (ALD) process.

The atomic layer deposition (ALD) process is a technology of depositing a thin film or a passivation layer on a surface of a substrate during a semiconductor process and a technology of stacking atomic layers one by one to grow thin film unlike a conventional deposition technology of chemically covering a thin film. The atomic layer deposition (ALD) process advantageously has excellent step-coverage, easily adjusts a thickness of a thin film, and forms a uniform thin film.

The coating layer including Cu and formed on a surface of the Ni powder may be formed using an atomic layer deposition (ALD) process and, thus, a dense and uniform Cu coating layer may be formed.

The internal electrode pattern may have a thickness equal to or less than 0.5 μm and, thus, the internal electrode may have a thickness equal to or less than 0.4 μm after being sintered. According to an exemplary embodiment of the present disclosure, even if a dielectric layer and an internal electrode are very thin, increase in electrode disconnection and delamination may be effectively prevented and, thus, an internal electrode with a thickness equal to or less than 0.4 μm may be formed.

Forming Ceramic Multilayer Structure

Ceramic green sheets with internal electrode patterns formed thereon may be stacked to form a ceramic multilayer structure.

In this case, the ceramic multilayer structure may be pressurized and compressed in a stack direction.

Then, the ceramic multilayer structure may be cut for each region corresponding to one capacitor to form a chip.

In this case, the ceramic multilayer structure may be cut to alternately expose ends of the internal electrode patterns through a lateral surface of the ceramic multilayer structure. Accordingly, as shown in FIGS. 6A and 6B, a ceramic green sheet (FIG. 6A) in which an internal electrode pattern P1 is formed as the first internal electrode 121 on a ceramic green sheet S after being sintered and a ceramic green sheet (FIG. 6B) in which an internal electrode pattern P2 is formed as the second internal electrode 122 on the ceramic green sheet S after being sintered may be alternately stacked.

Forming Body

The ceramic multilayer structure may be sintered to form a body including the dielectric layer and the internal electrode.

The sintering process may be performed in a reduction condition. The sintering process may be performed while adjusting a heating rate but the present disclosure is not limited thereto and, in this case, the heating rate may be 30° C./60 s to 50° C./60 s at 700° C. or less.

Then, an external electrode may be formed to cover the lateral surface of the body and to be electrically connected to the internal electrode exposed through the lateral surface of the body. Then, a plating layer formed of Ni, Sn, or the like may be formed on a surface of the external electrode.

It may not be required to particularly limit a size of the body.

However, to simultaneously achieve miniaturization and high capacity, a dielectric layer and an internal electrode need to be thinned to increase a stack number, thereby remarkably enhancing an effect of preventing increase in electrode disconnection and delamination in a multilayer ceramic electronic component with a size of 0402 (0.4 mm×0.2 mm) or less according to the present disclosure. Accordingly, the body may have a length equal to or less than 0.4 mm and a width equal to or less than 0.2 mm.

Multilayer Ceramic Electronic Component

A multilayer ceramic electronic component 100 manufactured using the aforementioned method of manufacturing a multilayer ceramic electronic component according to an exemplary embodiment of the present disclosure may include a body 110 including the dielectric layer 111 and the internal electrodes 121 and 122, and external electrodes 131 and 132 disposed on the body 110 and, in this case, the internal electrodes 121 and 122 may include Ni and Cu.

The body 110 may be configured in such a way that the dielectric layer 111 and the internal electrodes 121 and 122 are alternately stacked.

A detailed shape of the body 110 is not particularly limited but, as illustrated in the drawings, the body 110 may have a hexahedral shape or a similar shape thereto. Due to contraction of ceramic powder included in the body 110 during a sintering procedure, the body 110 may have a substantially hexahedral shape but not a hexahedral shape with a complete straight line.

The body 110 may include first and second surfaces 1 and 2 facing each other in the thickness direction (the Z direction), third and fourth surfaces 3 and 4 connected to the first and second surfaces 1 and 2 and facing each other in the width direction (the Y direction), and fifth and sixth surfaces 5 and 6 connected to the first and second surfaces 1 and 2, connected to the third and fourth surfaces 3 and 4, and facing each other in the longitudinal direction (the X direction).

The plurality of dielectric layers 111 forming the body 110 may be in a sintered state and may be integrated into each other in such a way that it is difficult to check a boundary between adjacent dielectric layers 111 without use of a scanning electron microscope (SEM).

A material of the dielectric layer 111 is not particularly limited as long as sufficient capacitance is acquirable and may be, for example, barium titanate ($BaTiO_3$) powder. A material for forming the dielectric layer 111 may be formed by adding various ceramic additives, organic solvents, plasticizers, bonding agents, dispersants, or the like to powder such as barium titanate ($BaTiO_3$) according to the objective of the present disclosure.

The capacitor body 110 may include a cover layer 112 that is formed at each of upper and lower portions thereof, that is, at opposite end portions in the thickness direction (the Z direction) thereof and is formed by stacking dielectric layers without an internal electrode. The cover layer 112 may maintain the reliability of a capacitor with respect to external shocks.

It may not be required to particularly limit the thickness of the cover layer 112. However, to easily achieve miniaturization and high capacity of a capacitor component, the cover layer 112 may have a thickness equal to or less than 20 μm.

It may not be required to particularly limit a thickness of the dielectric layer 111.

However, according to the present disclosure, plating anticorrosion, electrolytic delamination characteristics, and waterproof reliability may be enhanced without sinterability deterioration and, thus, the dielectric layer 111 may have a thickness equal to or less than 0.4 μm to simultaneously achieve miniaturization and high capacity of a capacitor component.

The thickness of the dielectric layer 111 may refer to an average thickness of the dielectric layers 111 disposed between the first and second internal electrodes 121 and 122.

The average thickness of the dielectric layers 111 may be measured by scanning an image of a section of the body 110 in a length-thickness (L-T) direction using a scanning electron microscope (SEM).

For example, with regard to arbitrary dielectric layer extracted from the image of the sectional view in the length-thickness (L-T) direction of the body 110, which is cut at a central portion of a width direction of the body 110 and is scanned using a scanning electronic microscope (SEM), thicknesses may be measured at 30 points spaced apart at equidistant intervals in the longitudinal direction to measure an average value.

The thicknesses may be measured at the 30 points spaced apart at equidistant intervals, which refers to a capacity formation portion at which the first and second internal electrodes 121 and 122 overlap with each other.

Then, the internal electrodes 121 and 122 and a dielectric layer may be alternately stacked and may include the first and second internal electrodes 121 and 122. The first and second internal electrodes 121 and 122 may be alternately disposed to face each other across the dielectric layer 111 configuring the body 110 and may be exposed through the third and fourth surfaces 3 and 4 of the body 110, respectively.

In this case, the first and second internal electrodes 121 and 122 may be electrically separated from each other by the dielectric layer 111 disposed therebetween.

As described above, the internal electrodes 121 and 122 are formed using Ni powder including a coating layer with a surface including Cu and, thus, may include Ni and Cu. Accordingly, plating anticorrosion, electrolytic delamination characteristics, and waterproof reliability may be enhanced and there is no sinterability deterioration and, thus, it may be possible to embody a miniaturized and high-capacity multilayer ceramic capacitor.

The conductive paste may be printed using a screen printing method, a Gravure printing method, or the like but the present disclosure is not limited thereto.

It may not be required to particularly limit a thickness of the first and second internal electrodes 121 and 122.

However, according to the present disclosure, plating anticorrosion, electrolytic delamination characteristics, and waterproof reliability may be enhanced without sinterability deterioration and, thus, the first and second internal electrodes 121 and 122 may have a thickness equal to or less than 0.4 μm to easily achieve miniaturization and high capacity of a capacitor component.

The thickness of the first and second internal electrodes 121 and 122 may refer to an average thickness of the first and second internal electrodes 121 and 122.

The average thickness of the first and second internal electrodes 121 and 122 may be measured by scanning an image of a section of the body 110 in a length-thickness (L-T) direction using a scanning electron microscope (SEM).

For example, with regard to arbitrary first and second internal electrodes 121 and 122 extracted from the image of the sectional view in the length-thickness (L-T) direction of the body 110, which is cut at a central portion of a width direction of the body 110 and is scanned using a scanning electronic microscope (SEM), thicknesses may be measured at 30 points spaced apart at equidistant intervals in the longitudinal direction to measure an average value.

The thicknesses may be measured at the 30 points spaced apart at equidistant intervals that is a capacity formation portion at which the first and second internal electrodes 121 and 122 overlap with each other.

The external electrodes 131 and 132 may be disposed in the body 110 and may be connected to the internal electrodes 121 and 122. As shown in FIG. 8, the capacitor component 100 may include the first and second internal electrodes 121 and 122 and the first and second external electrodes 131 and 132 connected thereto, respectively. According to the present embodiment, although the structure in which the capacitor component 100 includes two external electrodes 131 and 132 is described, the number, the shape, or the like of the external electrodes 131 and 132 may be changed depending on a shape of the internal electrodes 121 and 122 or other objectives.

The external electrodes 131 and 132 may be formed of any material as long as the material has electrical conductivity, such as metal, a detailed material may be determined in consideration of electrical characteristics, structural stability, and so on, and the external electrodes 131 and 132 may have a multi-layered structure.

For example, the external electrodes 131 and 132 may include electrode layers 131a and 132a disposed in the body 110 and plating layers 131b and 132b formed on the electrode layers 131a and 132a.

As a more detailed example of the electrode layers 131a and 132a, the electrode layers 131a and 132a may be a sintered electrode including conductive metal and glass and, in this case, the conductive metal may be Cu. In addition, the electrode layers 131a and 132a may be a resin-based electrode including a plurality of metallic particles and conductive resin.

As a more detailed example of the plating layers 131b and 132b, the plating layers 131b and 132b may be an Ni plating layer or a Sn plating layer, may be formed in such a way that an Ni plating layer and a Sn plating layer are sequentially formed on the electrode layers 131a and 132a, or may include a plurality of Ni plating layers and/or a plurality of Sn plating layers.

It may not be required to particularly limit a size of the multilayer ceramic electronic component.

However, to simultaneously achieve miniaturization and high capacity, a thickness of a dielectric layer and an internal electrode needs to be reduced and a stack number needs to be increased, thereby remarkably enhancing an effect of preventing increase in electrode disconnection and delamination according to the present disclosure in a multilayer ceramic electronic component with a size equal to or less than 0402 (0.4 mm×0.2 mm). Accordingly, the multilayer ceramic electronic component may have a length equal to or less than 0.4 mm and a width equal to or less than 0.2 mm. In the multilayer ceramic electronic component, a ratio of a length of a portion on which an internal electrode is actually formed to an entire length of the internal electrode may be greater than or equal to 85%.

As set forth above, according to the present disclosure, a paste for an internal electrode including Ni powder including a coating layer with a surface including Cu may be used, thereby preventing electrolytic cracking from occurring to enhance waterproof reliability without sinterability deterioration.

While exemplary embodiments have been shown and described above, it will be apparent to those skilled in the art that modifications and variations could be made without departing from the scope of the present disclosure as defined by the appended claims.

What is claimed is:

1. A method of manufacturing a multilayer ceramic electronic component, the method comprising:
    preparing a ceramic green sheet;
    forming an internal electrode pattern by coating a paste for an internal electrode on the ceramic green sheet, the paste including nickel (Ni) powder and a coating layer formed on a surface of the Ni powder;
    forming a ceramic multilayer structure by stacking the ceramic green sheet with the internal electrode pattern formed thereon; and
    forming a body including a dielectric layer and an internal electrode by sintering the ceramic multilayer structure,
    wherein the coating layer includes copper (Cu) and a content of Cu is equal to or greater than 0.2 wt %, based on a total weight of the Ni powder, and
    wherein the content of Cu is less than or equal to 1.5 wt %, based on the total weight of the Ni powder.

2. The method of claim 1, wherein the ceramic green sheet has a thickness equal to or less than 0.6 μm and the internal electrode pattern has a thickness equal to or less than 0.5 μm.

3. The method of claim 1, wherein the coating layer further includes at least one selected from the group consisting of tungsten (W), molybdenum (Mo), chromium (Cr), and cobalt (Co).

4. The method of claim 1, wherein the coating layer further includes tin (Sn).

5. The method of claim 1, wherein the coating layer is formed using an atomic layer deposition (ALD) process.

6. The method of claim 1, wherein the Ni powder further includes an alloy of at least one selected from the group consisting of tungsten (W), molybdenum (Mo), chromium (Cr), and cobalt (Co).

7. The method of claim 1, wherein the Ni powder further includes an alloy of tin (Sn).

8. The method of claim 1, wherein the Ni powder further includes sulfur (S) in a content of 300 ppm or less, based on a content of the Ni powder.

9. The method of claim 1, wherein the body has a length equal to or less than 0.4 mm and a width equal to or less than 0.2 mm.

10. The method of claim 1, wherein the Ni powder further includes an alloy of at least one selected from the group consisting of copper (Cu), silver (Ag), palladium (Pd), platinum (Pt), rhodium (Rh), iridium (Ir), and ruthenium (Ru).

11. A multilayer ceramic electronic component comprising a ceramic body including a dielectric layer and an internal electrode; and an external electrode disposed on the ceramic body, wherein the internal electrode includes nickel (Ni) and copper (Cu), the ceramic body being manufactured by a method comprising:

preparing a ceramic green sheet;

forming an internal electrode pattern by coating a paste for the internal electrode on the ceramic green sheet, the paste including nickel (Ni) powder and a coating layer formed on a surface of the Ni powder;

forming a ceramic multilayer structure by stacking the ceramic green sheet with the internal electrode pattern formed thereon; and forming the ceramic body including the dielectric layer and the internal electrode by sintering the ceramic multilayer structure, wherein the coating layer includes copper (Cu) and a content of Cu is equal to or greater than 0.2 wt %, based on a total weight of the Ni powder, and wherein the content of Cu is less than or equal to 1.5 wt %, based on the total weight of the Ni powder.

12. The multilayer ceramic electronic component of claim 11, wherein the dielectric layer has a thickness equal to or less than 0.4 µm and the internal electrode has a thickness equal to or less than 0.4 µm.

13. The multilayer ceramic electronic component of claim 11, wherein C≥85%, where C is a ratio of a length of a portion on which an internal electrode is actually formed to an entire length of the internal electrode.

* * * * *